(No Model.)  2 Sheets—Sheet 1.
T. SANDS.
WEIGHING SCALES.
No. 415,221. Patented Nov. 19, 1889.
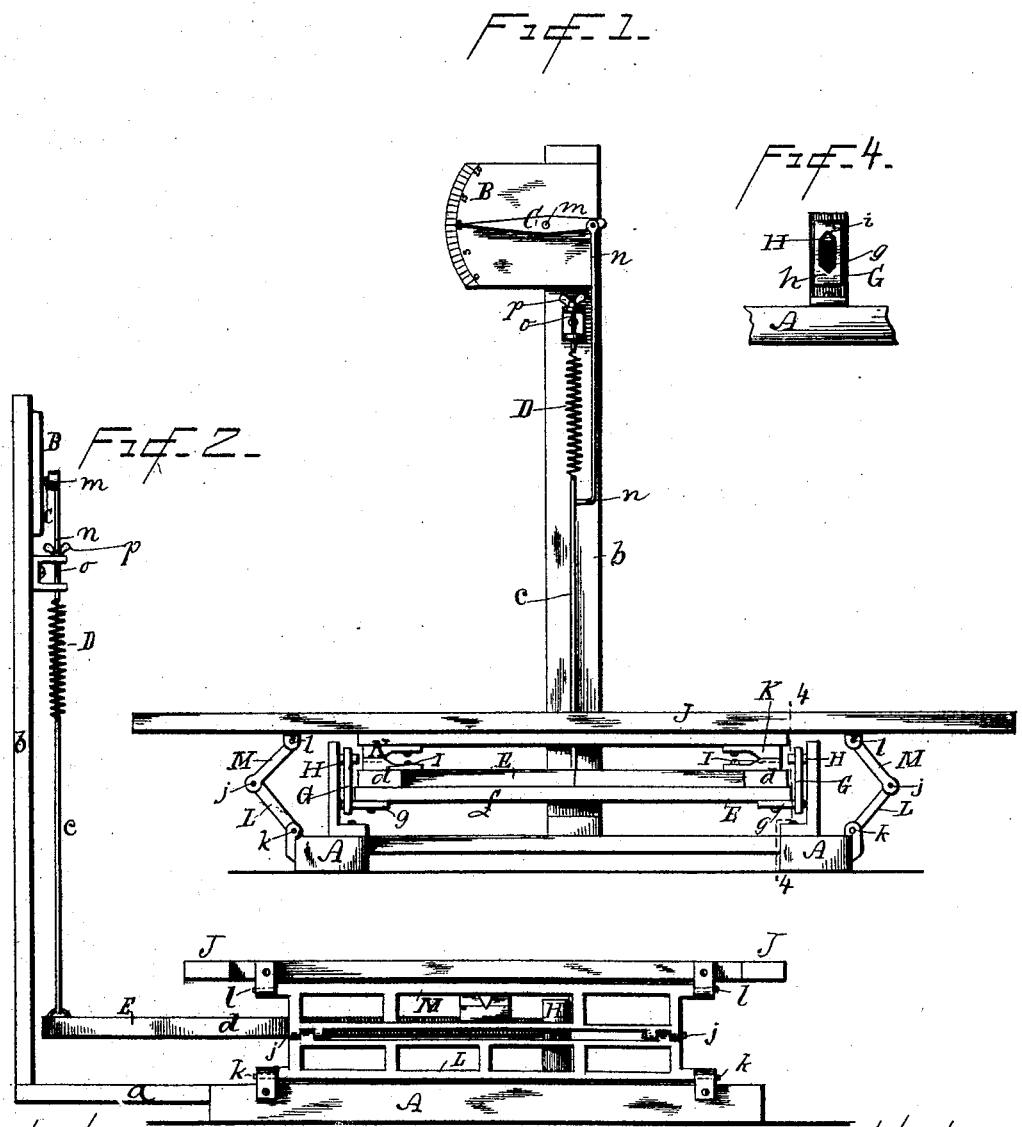
WITNESSES:
Norris A. Clark
Maude M. Howlett
INVENTOR:
Thomas Sands
By his Attorney,
J. S. Brown.

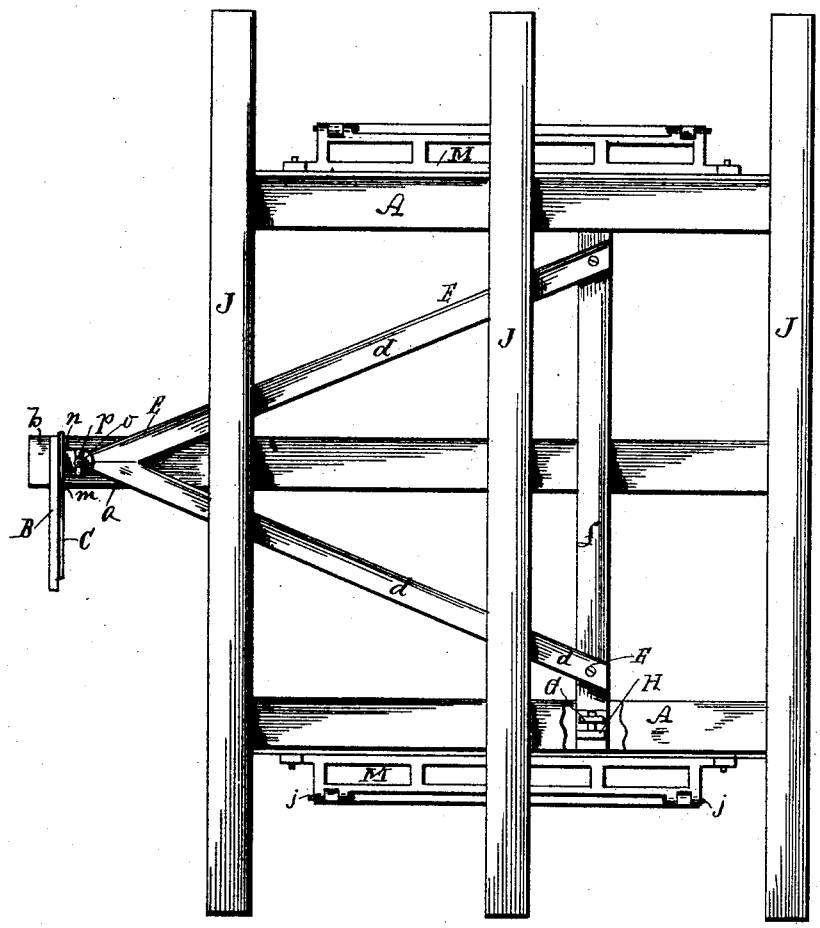

UNITED STATES PATENT OFFICE.

THOMAS SANDS, OF NASHUA, NEW HAMPSHIRE.

WEIGHING-SCALES.

SPECIFICATION forming part of Letters Patent No. 415,221, dated November 19, 1889.

Application filed November 12, 1888. Serial No. 290,560. (No model.)

*To all whom it may concern:*

Be it known that I, THOMAS SANDS, a citizen of the United States, residing at Nashua, in the county of Hillsborough and State of New Hampshire, have invented certain new and useful Improvements in Weighing-Scales; and I do hereby declare that the following is a full and exact description of the same, reference being had to the accompanying drawings, making part of this specification.

My improved weighing-scales belong to the general class of platform-scales. They are intended particularly for farmers' and stable-keepers' use, for weighing out exact quantities of hay and other feed to give to cattle, horses, and other animals; but the improvements herein set forth are applicable to scales for other uses.

The features of improvement are set forth in the following specification, and specified in the claims.

In the accompanying drawings, Figure 1 represents a front view of my improved scales; Fig. 2, a side view of the same; Fig. 3, a top view of the same, all but the frame of the platform being removed to show the operative parts beneath; and Fig. 4, a view of a part detached, represented as taken in a plane indicated by the line 4 4, Fig. 1.

A supporting-base A, of suitable form and required dimensions, is provided for sustaining the operative part of the weighing-scales. From one side of this supporting-base a beam $a$ conveniently and ordinarily extends, which supports a standard $b$, on which is mounted the graduated dial B, for indicating the weight of the articles or substances weighed, and it also supports the index C and a spring D, a spring-balance being preferred in this invention. A rod $c$, attached at one end to the spring D, is at its other end linked or coupled to one end of a balance-frame E. This balance-frame is preferably formed of two divergent levers $d\ d$, joined together at one end and having their other ends secured to a transverse bar $f$, which forms the axis on which the balance-frame E oscillates in the act of weighing. The two ends of the transverse axial bar $f$ are provided, respectively, with knife-edged fulcra $g\ g$, Figs. 1 and 4, which rest in angular bearings $h\ h$ of supporting stirrups or links G G, suspended by similar angular bearings $i\ i$ at their upper ends upon knife-edged supports H H, which are fixedly attached to opposite sides of the base A in the proper positions, as shown or otherwise. The balance-frame E is thus supported at one end by the balancing mechanism consisting of the spring D and its connections, and at the opposite end by the axis or bar $f$ and its supporting bearings. Any weight applied to the frame E will thus cause the spring D to be lengthened, the lengthening of the spring depending upon the weight applied, the frame E turning or swinging on the supports of the axial bar $f$. Then upon the two divergent levers $d\ d$ of the balance-frame E are secured, respectively, angular bearings I I in transverse line across the frame, in the proper positions to obtain the proper proportional leverage in relation to the balance-spring used. Upon these two bearings rest the platform J by means of knife-edged projections K K fitting upon the said bearings. Thus the whole weight of the platform and of the article or substance weighed at any time bears upon those bearings I I on the balance-frame E, their positions of course being substantially central under the platform in the direction transverse to the knife-edges.

In order to hold the platform balanced in its level position and keep its positions at different heights always parallel without the delicacy of weighing being interfered with thereby, I employ two pairs of oppositely-situated hinged bars L M L M, respectively, at opposite sides of the frame, the respective pairs being united or hinged together at inclinations substantially equal, but in opposite directions, as shown clearly in Fig. 1. To be light, these hinged bars may be of skeleton form, as shown in Fig. 2. Each pair of these bars is hinged together near its ends, as shown at $j\ j$. The lower bar L of each pair is hinged to the supporting-frame A at $k\ k$, and the upper bar M of each pair is hinged to the adjacent edge of the platform J at $l\ l$, the axial lines of these several hinges being at right angles to the line of bearings of the platform upon the balance-frame, as clearly shown in the drawings.

Thus by the combined construction above set forth an accurate and sufficiently sensitive weighing-machine is produced without the requirement of any inclosing-case or holding-guides for the platform, and one which is very simple and cheap in construction, and therefore well adapted to general use among farmers and stable-keepers, since it may be procured at little expense.

As represented, the dial-scale is formed in the arc of a circle, the index or pointer C is made to turn on a pivot $m$, and a connecting-rod $n$ connects the index with the rod $c$, which connects the scale-spring D and balance-lever, so that the index is moved as the balance-lever vibrates. An adjustable screw $o$ and nut $p$, or equivalent means, may be employed to adjust the spring accurately to the correct tension.

I claim as my invention—

1. The combination of the balancing mechanism, the supporting-base having bearings, stirrups suspended from said bearings, a balance-frame consisting of side-diverging levers and a transverse axial bar, said balance-frame being supported at one end by said balancing mechanism and at the opposite end by fulcra on said axial bar, which rest in said stirrups, bearings on said side-diverging levers arranged in transverse lines thereon and located intermediate between the supports of said balance-frame, and a platform centrally supported and resting on said lever-bearings, substantially as set forth.

2. The combination of a supporting-base, a balance-frame having its fulcra resting on bearings supported by a base, a platform having knife-edged bearings upon the balance-frame, and opposite pairs of guide-bars hinged together at angles opposite to each other, as specified, one bar of each pair being hinged to the supporting-base and the other bar of the pair being hinged to the platform, substantially as and for the purpose herein set forth.

In witness whereof I have hereunto signed my name in the presence of two subscribing witnesses.

THOMAS SANDS.

Witnesses:
JOSEPH L. CLOUGH,
FREDERICK A. EATON.